United States Patent
Kuslys et al.

(10) Patent No.: US 12,369,612 B2
(45) Date of Patent: Jul. 29, 2025

(54) EXTENSIVELY HYDROLYSED INFANT FORMULA

(71) Applicant: SOCIETE DES PRODUITS NESTLE S.A., Vevey (CH)

(72) Inventors: Martinas Jurgis Kuslys, Grosshoechstetten (CH); Philippe Steenhout, Leytron (CH); Anette Jarvi, Lausanne (CH); Eva Ackermann, Gundelfingen (DE)

(73) Assignee: Societe des Produits Nestle S.A., Vevey (CH)

( * ) Notice: Subject to any disclaimer, the term of this patent is extended or adjusted under 35 U.S.C. 154(b) by 112 days.

(21) Appl. No.: 17/754,926

(22) PCT Filed: Oct. 16, 2020

(86) PCT No.: PCT/EP2020/079205
§ 371 (c)(1),
(2) Date: Apr. 15, 2022

(87) PCT Pub. No.: WO2021/074374
PCT Pub. Date: Apr. 22, 2021

(65) Prior Publication Data
US 2024/0138460 A1  May 2, 2024

(30) Foreign Application Priority Data
Oct. 17, 2019  (EP) .................... 19203863

(51) Int. Cl.
*A23L 33/00* (2016.01)
*A23L 33/12* (2016.01)
(Continued)

(52) U.S. Cl.
CPC ............... *A23L 33/40* (2016.08); *A23L 33/12* (2016.08); *A23L 33/125* (2016.08);
(Continued)

(58) Field of Classification Search
CPC .......... A23L 33/40; A23L 33/12; A23L 33/18; A23L 33/19; A23L 33/175; A23L 33/125
(Continued)

(56) References Cited

U.S. PATENT DOCUMENTS

2024/0138460 A1* 5/2024 Kuslys .................... A23L 33/40

FOREIGN PATENT DOCUMENTS

CN  103442717 A  12/2013
CN  103582426 A  2/2014
(Continued)

OTHER PUBLICATIONS

Borschel et al. "Comparison of Growth of Healthy Term Infants Fed Extensively Hydrolyzed Protein- and Amino Acid-Based Infant Formulas" Nutrients, 2018, vol. 10, No. 3, 15 pages.
(Continued)

*Primary Examiner* — Brent T O'Hern
(74) *Attorney, Agent, or Firm* — K&L Gates LLP (57) ABSTRACT

An extensively hydrolysed infant formula (eHF) comprising protein, carbohydrate and fat, wherein the eHF comprises about 2.4 g or less protein per 100 kcal, wherein about 30% or less by weight of the fat is medium chain triglycerides (MCTs), and wherein the eHF may further comprise 2'-fucosyllactose (2'FL) and/or lacto-N-neotetraose (LNnT).

18 Claims, 6 Drawing Sheets

(51) Int. Cl.
  *A23L 33/125* (2016.01)
  *A23L 33/175* (2016.01)
  *A23L 33/18* (2016.01)
  *A23L 33/19* (2016.01)

(52) U.S. Cl.
  CPC ............. *A23L 33/175* (2016.08); *A23L 33/18* (2016.08); *A23L 33/19* (2016.08)

(58) Field of Classification Search
  USPC ........................................................ 426/656
  See application file for complete search history.

(56) References Cited

FOREIGN PATENT DOCUMENTS

| CN | 105682664 A | 6/2016 | |
|---|---|---|---|
| CN | 106998774 A | 8/2017 | |
| CN | 108697721 A | 10/2018 | |
| JP | 2011504365 A | 2/2011 | |
| JP | 2018509905 A | 4/2018 | |
| WO | 2006069918 | 7/2006 | |
| WO | 2015077233 | 5/2015 | |
| WO | 2015078505 | 6/2015 | |
| WO | 2017129645 | 8/2017 | |
| WO | WO-2017129645 A1 * | 8/2017 | ........... A23L 33/105 |

OTHER PUBLICATIONS

Totzauer et al. "Effect of Lower Versus Higher Protein Content in Infant Formula Through the First Year on Body Composition from 1 to 6 Years: Follow-Up of a Randomized Clinical Trial" Obesity Research, 2018, vol. 26, No. 7, pp. 1203-1210.

Cai, "Pediatric Clinical Nutrition Support", 1st Edition, Jun. 30, 2019, pp. 236-237.

Office Action Received for Application No. CN202080071621.2, mailed on Oct. 13, 2023, 8 Pages of Official Copy.

Chinese Office Action for Appl No. 202080071621.2 dated May 31, 2023.

"Morinaga Milk E Baby Small Can 300g [0 Months~ 1 Year Old Newborn Powdered Milk] Lactoferrin 3 Types of Oligosaccharides", Food, Beverages & Liquor, Retreived from <URL: https://amzn.asia/d/6tttYtR>, Apr. 24, 2014, 8 Pages.

Nowak-Wegrzyn et al., "Confirmed Hypoallergenicity of a Novel Whey-Based Extensively Hydrolyzed Infant Formula Containing Two Human Milk Oligosaccharides", Nutrients, vol. 11, Issue No. 7, Jun. 26, 2019, pp. 1-10.

Urashima et al., "Advanced Studies of the Biological Functions of Milk Oligosaccharides (3)", Applied Glycoscience, vol. 8, Issue No. 2, 2018, pp. 155-163.

Japanese Office Action for Appl No. 2022-520134 dated Oct. 15, 2024, 12 pages.

* cited by examiner

EXTENSIVELY HYDROLYSED INFANT FORMULA

CROSS REFERENCE TO RELATED APPLICATIONS

The present application is a National Stage of International Application No. PCT/EP2020/079205, filed on Oct. 16, 2020. which claims priority to European Patent Application No. 19203863.6, filed on Oct. 17, 2019, the entire contents of which are being incorporated herein by reference.

FIELD OF THE INVENTION

The present invention relates to extensively hydrolysed infant formulas (eHFs) comprising a reduced amount of protein.

BACKGROUND TO THE INVENTION

Cow's milk protein (CMP) is the leading cause of food allergy in infants, affecting 2-3% children worldwide. Most children with CMP-allergy (CMPA) have two or more symptoms: 50-70% have skin symptoms; 50-60% have gastrointestinal symptoms; and 20-30% have airway symptoms. Severe and life-threatening symptoms may occur in 10% of children. Management of these patients focuses on the avoidance of CMP and prompt recognition and treatment of allergic reactions resulting from accidental exposure (Nutten, 2018. EMJ Allergy Immunol, 3(1), pp. 50-59).

Human breast milk and breast feeding are considered to be the optimal form of nutrition for healthy infants during the first months of life. Breast milk remains the gold standard for feeding infants with CMPA. The European Society for Paediatric Gastroenterology, Hepatology and Nutrition (ESPGHAN) recommends that CMPA is best treated in breast-fed infants by complete elimination of cow's milk from the mother's diet (Koletzko, S., et al., 2012. Journal of pediatric gastroenterology and nutrition, 55(2), pp. 221-229).

Specialty infant formulas are recommended when breast-feeding is not possible. ESPGHAN recommends that for non-breast-fed infants with CMPA, formulas based on extensively hydrolysed proteins are used, with proven efficacy in infants with CMPA. In infants with extremely severe or life-threatening symptoms an amino acid formula may be considered as the first choice (Koletzko, S., et al., 2012. Journal of pediatric gastroenterology and nutrition, 55(2), pp. 221-229).

Extensively hydrolyzed infant formulas (eHF) may have lower absorption of nitrogen than full protein formulas or human milk (Rigo, J., et al., 1995. European journal of clinical nutrition, 49, pp. S26-38). Thus, eHFs typically contain 2.6-2.8 g protein per 100 kcal, to cover the needs of infants (Borschel, M., et al., 2018. Nutrients, 10(3), p. 289).

Consumption of higher protein infant formula has, however, been associated with greater weight and body mass index at 2 years of age and higher circulating concentrations of plasma essential amino acids, insulin-like growth factor-1, and C-peptide, which can induce weight gain and adipogenic activity. Lower protein content may diminish the later risk of obesity (Totzauer, M., et al., 2018. Obesity, 26(7), pp. 1203-1210).

Accordingly, there is a need for eHFs with a reduced amount of protein which support appropriate growth and development of allergic infants, and which are safe and well-tolerated.

SUMMARY OF THE INVENTION

The inventors have developed an eHF with a reduced amount of protein. Thus, the eHF described herein has a protein content closer to that of human breast milk and may diminish the risk of obesity later in life.

The inventors have surprisingly shown that the eHF supported appropriate growth and development of allergic infants. Moreover, the eHF was safe and well-tolerated. This may be, at least in part, attributed to the degree of hydrolysis, the very small amount of peptides larger than 1200 Da and/or the absence of medium-chain triglyceride (MCT).

The inventors have surprisingly shown that the eHF supported appropriate growth and development of allergic infants. Moreover, the eHF was safe and well-tolerated. This may be, at least in part, attributed to the degree of hydrolysis, the very small amount of peptides larger than 1200 Da, the and/or the low level/absence of medium-chain triglyceride (MCT). and/or the presence of human milk oligosaccharides (HMOs).

Accordingly, in one aspect the invention provides an extensively hydrolysed infant formula (eHF) comprising protein, carbohydrate and fat, wherein the eHF comprises about 2.4 g or less protein per 100 kcal, and wherein about 30% or less by weight of the fat is medium chain triglycerides (MCTs).

The eHF may preferably comprises one or more of human milk oligosaccharide (HMO). In one aspect, the eHF comprises 2'-fucosyllactose (2'FL) and/or lacto-N-neotetraose (LNnT), preferably 2'FL and LNnT. The eHF may comprise 0.5-3 g/L, 0.8-1.5 g/L, or about 1 g/L 2'FL. Preferably, the eHF comprises about 1 g/L 2'FL. The eHF may comprise 0.2-1 g/L, 0.5-0.8 g/L, or about 0.5 g/L LNnT. Preferably, the eHF comprises about 0.5 g/L LNnT. More preferably, the eHF comprises about 1 g/L 2'FL and about 0.5 g/L LNnT.

The eHF may comprise about 1.8 g or more protein per 100 kcal. For example, the eHF may comprise 1.8-2.4 g protein per 100 kcal, 2.1-2.3 g protein per 100 kcal, or 2.15-2.25 g protein per 100 kcal. Preferably, the eHF comprises about 2.2 g protein per 100 kcal.

About 25% or less by weight, 20% or less by weight, 15% or less by weight, 10% or less by weight, 5% or less by weight, or 1% or less by weight of the fat may be medium chain triglycerides (MCTs). Preferably about 0% by weight of the fat is MCTs and/or the eHF comprises no added MCTs. Most preferably, the eHF comprises no added MCTs.

At least about 95%, at least about 98%, at least about 99% or about 100% by weight of the peptides in the eHF may have a molecular mass of less than about 3000 Da. Preferably, there are no detectable peptides in the eHF about 3000 Da or greater in size.

At least about 90%, at least about 95%, at least about 98% or at least about 99% by weight of the peptides in the eHF may have a molecular mass of less than about 1500 Da. Preferably, at least about 99% of the peptides in the eHF have a molecular mass of less than about 1500 Da.

At least about 85%, at least about 90%, at least about 95%, at least about 98% or at least about 99% by weight of the peptides in the eHF may have a molecular mass of less than about 1200 Da. Preferably, at least 98% of the peptides by weight have a molecular mass of less than about 1200 Da.

At least about 45%, at least about 50%, 45-55%, or 50-54% by weight of the peptides in the eHF may be di- and tri-peptides. Preferably, about 51-53%, or more preferably, about 52% by weight of the peptides in the eHF are di- and tri-peptides.

At least about 45%, at least about 50%, 45-55%, or 50-54% by weight of the peptides in the eHF may have a molecular weight of between 240 and 600 Da. Preferably, about 51-53%, or more preferably about 52% by weight of the peptides in the eHF have a molecular weight of between 240 and 600 Da.

At least about 50%, at least about 60%, at least about 70%, at least about 80%, at least about 90%, or about 100% of the protein may be whey protein. Preferably, the protein source is whey protein.

The eHF may comprise free amino acids. The free amino acids may be present in a concentration of 50% or less, 40% or less, 30% or less, or 25% or less by weight based on the total weight of amino acids. Preferably, the free amino acids are present in a concentration of 20-25%, 21-23%, or about 22% by weight based on the total weight of amino acids.

The eHF may comprise 9-14 g carbohydrate per 100 kcal and/or 4.0-6.0 g fat per 100 kcal. The eHF may have an energy density of 60-72 kcal per 100 mL.

In another aspect the invention provides a method of feeding an infant comprising administering to the infant an eHF according to the present invention. Preferably, the infant has cow's milk protein allergy.

In another aspect the invention provides an eHF according to the invention for use in treating cow's-milk protein allergy, chronic diarrhea and/or malabsorption. In one embodiment the invention provides an eHF according to the invention for use in treating cow's-milk protein allergy.

In another aspect the invention provides an eHF according to the invention for use in preventing obesity and/or reducing the risk of obesity.

In another aspect the invention provides a method of producing an eHF according to the present invention.

BRIEF DESCRIPTION OF THE SEVERAL VIEWS OF THE DRAWING(S)

Mean body weight in kg against months since baseline visit for Test formula (low protein plus HMOs) and Control Formula. There was no significant difference at any of the time points between the groups.

Mean weight-for-age Z score against months since baseline visit for Test formula (low protein plus HMOs) and Control Formula. There was no significant difference at any of the time points between the groups.

Treatment effect on weight gain at visit 4. Primary analysis shows that weight gain [g/d] of infants receiving Test formula was non-inferior to growth with the Control formula.

Mean length-for-age z-score against months since baseline visit for Test formula (low protein plus HMOs) and Control Formula. There was no significant difference at any of the time points between the groups.

Mean head circumference-for-age Z score against months since baseline visit for Test formula (low protein plus HMOs) and Control Formula. There was no significant difference at any of the time points between the groups.

Mean BMI-for-age Z score against months since baseline visit for Test formula (low protein plus HMOs) and Control Formula. There was no significant difference at any of the time points between the groups.

DETAILED DESCRIPTION OF THE INVENTION

Various preferred features and embodiments of the present invention will now be described by way of non-limiting examples.

It must be noted that as used herein and in the appended claims, the singular forms "a", "an", and "the" include plural referents unless the context clearly dictates otherwise.

The terms "comprising", "comprises" and "comprised of" as used herein are synonymous with "including" or "includes"; or "containing" or "contains", and are inclusive or open-ended and do not exclude additional, non-recited members, elements or steps. The terms "comprising", "comprises" and "comprised of" also include the term "consisting of".

As used herein the term "about" means approximately, in the region of, roughly, or around. When the term "about" is used in conjunction with a numerical value or range, it modifies that value or range by extending the boundaries above and below the numerical value(s) set forth. In general, the terms "about" and "approximately" are used herein to modify a numerical value(s) above and below the stated value(s) by 10%.

The publications discussed herein are provided solely for their disclosure prior to the filing date of the present application. Nothing herein is to be construed as an admission that such publications constitute prior art to the claims appended hereto.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range.

Extensively Hydrolysed Formula

The term "extensively hydrolysed infant formula" or "eHF" may refer to an infant formula comprising extensively hydrolysed protein. The eHF may be a hypoallergenic infant formula which provide complete nutrition for infants who cannot digest intact CMP or who are intolerant or allergic to CMP.

The term "infant formula" may refer to a foodstuff intended for particular nutritional use by infants during the first year of life and satisfying by itself the nutritional requirements of this category of person, as defined in European Commission Regulation (EU) 2016/127 of 25 Sep. 2015.

A "hypoallergenic" composition is a composition which is unlikely to cause allergic reactions. Suitably, the eHF of the invention is tolerated by more than 90% of infants with CMPA. This is in line with the guidance provided by the American Academy of Pediatrics (Committee on Nutrition, 2000. Pediatrics, 106(2), pp. 346-349). Suitably, the eHF of the invention may not contain peptides which are recognized by CMP-specific IgE e.g. from subjects with CMPA.

Infants can be fed solely with eHF or the eHF can be used as a complement of human milk.

The eHF of the invention may be in the form of a powder or liquid.

The liquid may be, for example, a concentrated liquid eHF or a ready-to-feed eHF. The eHF may be in the form of a reconstituted eHF (i.e. a liquid eHF that has been reconstituted from a powdered form). The concentrated liquid eHF is preferably capable of being diluted into a liquid composition suitable for feeding an infant, for example by the addition of water.

In one embodiment, the eHF is in a powdered form. The powder is capable of being reconstituted into a liquid composition suitable for feeding an infant, for example by the addition of water.

The eHF may have an energy density of about 60-72 kcal per 100 mL, when formulated as instructed. Suitably, the eHF may have an energy density of about 60-70 kcal per 100 mL, when formulated as instructed.

Protein

The term "protein" includes peptides and free amino acids. The protein content of the eHF may be calculated by any method known to those of skill in the art. Suitably, the protein content may be determined by a nitrogen-to-protein conversion method. For example, as described in Maubois, J. L. and Lorient, D., 2016. Dairy science & technology, 96(1), pp. 15-25. Preferably the protein content is calculated as nitrogen content×6.25, as defined in European Commission Regulation (EU) 2016/127 of 25 Sep. 2015. The nitrogen content may be determined by any method known to those of skill in the art. For example, nitrogen content may be measured by the Kjeldahl method.

Protein Concentration eHFs typically contain 2.6-2.8 g protein per 100 kcal, to cover the needs of infants suffering gastrointestinal pathologies with severe malabsorption or infants requiring more proteins and calories to cover a higher metabolic rate.

The inventors have surprisingly shown that an eHF with a lower protein content may support appropriate growth and development of allergic infants. Moreover, the inventors have surprisingly shown that the eHF was safe and well-tolerated.

Accordingly, the eHF of the present invention comprises about 2.4 g or less protein per 100 kcal. For example, the eHF of the present invention may comprise about 2.3 g or less protein per 100 kcal, 2.25 g or less protein per 100 kcal, or 2.2 g or less protein per 100 kcal.

Suitably, the eHF comprises about 1.8 g or more protein per 100 kcal. For example, the eHF of the present invention may comprise about 1.86 g or more protein per 100 kcal, 1.9 g or more protein per 100 kcal, 2.0 g or more protein per 100 kcal, or 2.1 g or more protein per 100 kcal. Preferably, the eHF comprises about 1.86 g or more protein per 100 kcal, in line with present EU regulations (EFSA NDA Panel, 2014. EFSA journal, 12(7), 3760).

The eHF of the present invention may comprise 1.8-2.4 g protein per 100 kcal, 1.86-2.4 g protein per 100 kcal, 1.9-2.4 g protein per 100 kcal, 2.0-2.4 g protein per 100 kcal, 2.0-2.3 g protein per 100 kcal, 2.1-2.3 g protein per 100 kcal, or 2.15-2.25 g protein per 100 kcal.

Preferably, the eHF comprises about 2.2 g protein per 100 kcal.

Protein Source

The source of protein may be any source suitable for use in an infant formula. Suitably, the protein is cow's milk protein.

An extensively hydrolysed/hydrolysed whey-based formula may be more palatable than an extensively hydrolysed/hydrolysed casein-based formula and/or the subject may only be sensitised to casein protein. Suitably, therefore, more than about 50%, more than about 60%, more than about 70%, more than about 80%, more than about 90%, or about 100% of the protein is whey protein. Preferably, the protein source is whey protein.

The whey protein may be a whey from cheese making, particularly a sweet whey such as that resulting from the coagulation of casein by rennet, an acidic whey from the coagulation of casein by an acid, or the acidifying ferments, or even a mixed whey resulting from coagulation by an acid and by rennet. This starting material may be whey that has been demineralized by ion exchange and/or by electrodialysis and is known as demineralised whey protein (DWP).

The source of the whey protein may be sweet whey from which the caseino-glycomacropeptide (CGMP) has been totally or partially removed. This is called modified sweet whey (MSW). Removal of the CGMP from sweet whey results in a protein material with threonine and trytophan contents that are closer to those of human milk. A process for removing CGMP from sweet whey is described in EP 880902.

The whey protein may be a mix of DWP and MSW.

In some embodiments, the amount of casein in the eHF is undetectable, for example less than 0.2 mg/kg. The amount of casein may be determined by any method known to those of skill in the art.

Degree of Hydrolysis

In eHFs, the protein is "extensively hydrolysed", such that the eHFs may be tolerated by more than 90% of infants with CMPA.

Protein hydrolysates may have an extent of hydrolysis that is characterised by NPN/TN %, which refers to the non-protein nitrogen divided by the total nitrogen×100. The non-protein nitrogen refers to amino nitrogen that is free to react with a reagent such as trinitrobenzenesulfonic acid (TNBS). NPN/TN % may be determined by any method known to those of skill in the art. For example, NPN/TN % may be measured as described in Adler-Nissen (Adler-Nissen, J. (1979) J. Agric. Food Chem. 27: 1256-1262). Suitably, the protein may have an NPN/TN % greater than 90%, greater than 95% or greater than 98%.

The extent of hydrolysis may also be determined by the degree of hydrolysis. The "degree of hydrolysis" (DH) is defined as the proportion of cleaved peptide bonds in a protein hydrolysate and may be determined by any method known to those of skill in the art. Suitably the degree of hydrolysis is determined by pH-stat, trinitrobenzenesulfonic acid (TNBS), o-phthaldialdehyde (OPA), trichloroacetic acid soluble nitrogen (SN-TCA), or formol titration methods. (Rutherfurd, S. M., 2010. Journal of AOAC International, 93(5), pp. 1515-1522). The degree of hydrolysis (DH) of the protein can be more than 90, more than 95 or more than 98.

The extent of hydrolysis may also be determined by the peptide molecular mass distribution. The peptide molecular mass distribution may be determined by high performance size exclusion chromatography, optionally with UV detection (HPSEC/UV) (Johns, P. W., et al., 2011. Food chemistry, 125(3), pp. 1041-1050). For example, the peptide molecular mass distribution may be a HPSEC peak area-based estimate determined at 205 nm, 214 nm or 220 nm. Suitably when the peptide molecular mass distribution is determined by HPSEC/UV, the "percentage of peptides by weight" that have a certain molecular mass may be estimated by the "fraction of peak area as a percentage of total peak area", that have the molecular mass, determined at 205 nm, 214 nm or 220 nm. Suitably, the extent of hydrolysis may be determined by the methods described in WO 2016/156077. Alternatively, the peptide molecular mass distribution may be determined by any method known to those of skill in the art, for example by sodium dodecyl sulphate-polyacrylamide gel electrophoresis (SDS-PAGE) (Chauveau, A., et al., 2016. Pediatric Allergy and Immunology, 27(5), pp. 541-543)

Theoretically, to bind with cell membrane-bound IgE, peptides should be greater than about 1500 Da in size (approximately 15 amino acids) and to crosslink IgE molecules and to induce an immune response, they must be greater than about 3000 Da in size (approximately 30 amino acids) (Nutten, 2018. EMJ Allergy Immunol, 3(1), pp. 50-59).

Suitably, therefore, at least about 95%, at least about 98%, at least about 99% or about 100% of the peptides by weight have a molecular mass of less than about 3000 Da. There may be no detectable peptides about 3000 Da or greater in size.

Suitably, therefore, at least about 95%, at least about 98%, at least about 99% or about 100% of the peptides by weight have a molecular mass of less than about 1500 Da. Preferably, at least 99% of the peptides by weight have a molecular mass of less than about 1500 Da. There may be no detectable peptides about 1500 Da or greater in size.

Preferably, at least about 85%, at least about 90%, at least about 95%, at least about 98% or at least about 99% of the peptides by weight have a molecular mass of less than about 1200 Da. More preferably, at least 95% or 98% of the peptides by weight have a molecular mass of less than about 1200 Da.

Suitably, at least about 80%, at least about 85%, at least about 90%, or at least about 95% of the peptides by weight have a molecular mass of less than about 1000 Da. Preferably, at least about 95% of the peptides by weight have a molecular mass of less than about 1000 Da.

Preferably, the eHF of the present invention has no detectable peptides about 3000 Da or greater in size; and at least about 95% of the peptides by weight have a molecular mass of less than about 1200 Da.

Having a high proportion of di- and tri-peptides may improve nitrogen (protein) absorption, even in patients with gut impairment. PEPT1 is a dedicated facilitator transport route for small peptide absorption (e.g. di- and tri-peptides). In the first weeks of life, intestinal PEPT1 is important for nutritional intake, and later for diet transition following weaning.

Thus, at least about 30%, at least about 40%, or at least about 50% of the peptides by weight are di- and tri-peptides. Preferably, at least about 45%, at least about 50%, 45-55%, or 50-54% of the peptides by weight are di- and tri-peptides. More preferably, about 51-53%, or most preferably, about 52% of the peptides by weight are di- and tri-peptides.

Suitably, at least about 30%, at least about 40%, or at least about 50% of the peptides by weight have a molecular mass of between 240 and 600 Da. Preferably, at least about 45%, at least about 50%, 45-55%, or 50-54% of the peptides by weight have a molecular mass of between 240 and 600 Da. More preferably, about 51-53%, or most preferably, about 52% of the peptides by weight have a molecular mass of between 240 and 600 Da.

The peptides in the eHF may have a median molecular weight of 300 Da to 370 Da, preferably 320 Da to 360 Da.

The principal recognised cow's milk allergens are alpha-lactalbumin (aLA), beta-lactoglobulin (bLG) and bovine serum albumin (BSA).

Suitably, therefore, the eHF may have non-detectable aLA content, for example about 0.010 mg/kg aLA or less; the eHF may have non-detectable bLG content, for example about 0.010 mg/kg bLG or less; and/or the eHF may have non-detectable BSA content, for example about 0.010 mg/kg BSA or less. Preferably, the eHF of the invention comprises no detectable amounts of aLA, bLG and BSA. The content of aLA, bLG and BSA may be determined by any method known to those of skill in the art, for example ELISA.

Method of Hydrolysis

Proteins for use in the eHF of the invention may be hydrolysed by any suitable method known in the art. For example, proteins may be enzymatically hydrolysed, for example using a protease. For example, protein may be hydrolysed using alcalase (e.g. at an enzyme:substrate ratio of about 1-15% by weight and for a duration of about 1-10 hours). The temperature may range from about 40° C. to 60° C., for example about 55° C. The reaction time may be, for example, from 1 to 10 hours and pH values before starting hydrolysis may, for example, fall within the range 6 to 9, preferably 6.5 to 8.5, more preferably 7.0 to 8.0.

Porcine enzymes, in particular porcine pancreatic enzymes may be used in the hydrolysis process. For example, WO9304593 A1 discloses a hydrolysis process using trypsin and chymotrypsin, which includes a two-step hydrolysis reaction with a heat denaturation step in between to ensure that the final hydrolysate is substantially free of intact allergenic proteins. The trypsin and chymotrypsin used in these methods are preparations produced by extraction of porcine pancreas.

WO2016156077A1 discloses a process for preparing a milk protein hydrolysate comprising hydrolysing a milk-based proteinaceous material with a microbial alkaline serine protease in combination with bromelain, a protease from *Aspergillus* and a protease from *Bacillus*.

Human Milk Oligosaccharides

The eHF of the invention may also contain one or more human milk oligosaccharide (HMO).

It is known that HMOs can be found in high concentrations in human breast milk. HMOs are highly resistant to enzymatic hydrolysis, indicating that they may display essential functions not directly related to their caloric value. It has especially been illustrated that they play a vital role in the early development of infants and young children, such as the maturation of the immune system. Many different kinds of HMOs are found in the human milk. Each individual oligosaccharide is based on a combination of glucose, galactose, sialic acid (N-acetylneuraminic acid), fucose and/or N-acetylglucosamine with many and varied linkages between them, thus accounting for the enormous number of different oligosaccharides in human milk—over 130 such structures have been identified so far. Almost all of them have a lactose moiety at their reducing end while sialic acid and/or fucose (when present) occupy terminal positions at the non-reducing ends. The HMOs can be acidic (e.g. charged sialic acid containing oligosaccharide) or neutral (e.g. fucosylated oligosaccharide).

Suitably, the eHF of the invention may comprise at least one fucosylated oligosaccharide.

A "fucosylated oligosaccharide" is an oligosaccharide having a fucose residue. It has a neutral nature. There can be one or several types of fucosylated oligosaccharide(s). The fucosylated oligosaccharide(s) can be selected from the list comprising 2'-fucosyllactose, 3-fucosyllactose, difucosyl-lactose, lacto-N-fucopentaose (such as lacto-N-fucopentaose I, lacto-N-fucopentaose II, lacto-N-fucopentaose III, lacto-N-fucopentaose V), lacto-N-fucohexaose, lacto-N-di-fucohexaose I, fucosyllacto-N-hexaose, fucosyllacto-N-neohexaose (such as fucosyllacto-N-neohexaose I, fucosyllacto-N-neohexaose II), difucosyllacto-N-hexaose I, difuco-lacto- N-neohexaose, difucosyllacto-N-neohexaose I, difucosyllacto-N-neohexaose II, fucosyl-para-Lacto-N-hexaose, tri-fuco-para-Lacto-N-hexaose I and any combination thereof. In some embodiments the fucosylated oligosaccharide comprises a 2'-fucosyl-epitope. It can be for example selected from the list comprising 2'-fucosyllactose, difucosyllactose, lacto-N-fucopentaose, lacto-N-fucohexaose, lacto-N-difucohexaose, fucosyllacto-N-hexaose, fucosyllacto-N-neohexaose, difucosyllacto-N-hexaose, difuco-lacto-N-neohexaose, difucosyllacto-N-neohexaose, fucosyl-para-Lacto-N-hexaose and any combination thereof.

In a preferred embodiment, the eHF according to the invention comprises 2'-fucosyllactose. In some embodiments, there is no other type of fucosylated oligosaccharide than 2'-fucosyllactose, i.e. the eHF of the invention comprises only 2'-fucosyllactose as fucosylated oligosaccharide.

Suitably, the eHF of the invention may comprise at least one N-acetylated oligosaccharide.

The expression "N-acetylated oligosaccharide(s) encompasses both "N-acetyl-lactosamine" and "oligosaccharide(s) containing N-acetyl-lactosamine". They are neutral oligosaccharides having an N-acetyl-lactosamine residue. There can be one or several types of N-acetylated oligosaccharide. The N-acetylated oligosaccharide(s) can be for example lacto-N-tetraose (LNT), lacto-N-neotetraose (LNnT) or any combination thereof. In some embodiments the N-acetylated oligosaccharide is lacto-N-neotetraose (LNnT), para-lacto-N-neohexaose (para-LNnH) or any combination thereof. In some embodiments the N-acetylated oligosaccharide is LNnT. In some embodiments the N-acetylated oligosaccharide is LNT. In some other embodiments the N-acetylated oligosaccharide is a mixture of LNT and LNnT. In some embodiments the eHF comprises both LNT and LNnT in a ratio LNT:LNnT between 5:1 and 1:2, or from 2:1 to 1:1, or from 2:1.2 to 2:1.6.

In a preferred embodiment, the eHF according to the invention comprises lacto-N-neotetraose (LNnT). In some embodiments, there is no other type of N-acetylated oligosaccharide than lacto-N-neotetraose (LNnT), i.e. the eHF of the invention comprises only lacto-N-neotetraose (LNnT) as N-acetylated oligosaccharide.

The N-acetylated oligosaccharide(s) may be synthesised chemically by enzymatic transfer of saccharide units from donor moieties to acceptor moieties using glycosyltransferases as described for example in U.S. Pat. No. 5,288,637 and WO 96/10086. Alternatively, LNT and LNnT may be prepared by chemical conversion of Keto-hexoses (e.g. fructose) either free or bound to an oligosaccharide (e.g. lactulose) into N-acetylhexosamine or an N-acetylhexosamine-containing oligosaccharide as described in Wrodnigg, T. M.; Stutz, A. E. (1999) Angew. Chem. Int. Ed. 38:827-828. N-acetyl-lactosamine produced in this way may then be transferred to lactose as the acceptor moiety.

Suitably, the eHF of the invention comprises at least one fucosylated oligosaccharide and at least one N-acetylated oligosaccharide.

In some embodiments, the eHF of the present invention comprises an oligosaccharide mixture that comprises 2'-fucosyllactose (2-FL) and/or lacto-N-neotetraose (LNnT). In a preferred embodiment, the eHF of the present invention comprises an oligosaccharide mixture that consists of 2'-fucosyllactose (2-FL) and lacto-N-neotetraose (LNnT). The eHF of the invention may comprise only 2'-fucosyllactose (2-FL) as fucosylated oligosaccharide and only lacto-N-neotetraose (LNnT) as N-acetylated oligosaccharide.

The fucosylated oligosaccharide(s) can be present in the eHF according to the present invention in a total amount of 0.5-3 g/L such as 0.8-1.5 g/L of the eHF (when formulated as instructed). In some embodiments, the fucosylated oligosaccharide(s) may be in a total amount of 0.85-1.3 g/L of the eHF, such as 0.9-1.25 g/L or 0.9-1.1 g/L or 1-1.25 g/L or 1-1.2 g/L of the eHF (when formulated as instructed). Preferably, the eHF (when formulated as instructed) comprises about 1 g/L fucosylated oligosaccharide(s) e.g. about 1 g/L 2'-fucosyllactose.

The N-acetylated oligosaccharide(s) can be present in the eHF according to the present invention in a total amount of 0.2-1 g/L such as 0.5-0.8 g/L of the eHF (when formulated as instructed). In some embodiments, the N-acetylated oligosaccharide(s) may be in a total amount of 0.5-0.75 g/L or 0.5-0.7 g/L or 0.5-0.6 g/L of the eHF (when formulated as instructed). Preferably, the eHF (when formulated as instructed) comprises about 0.5 g/L N-acetylated oligosaccharide(s) e.g. about 0.5 g/L lacto-N-neotetraose.

These different ranges can all be combined together.

Therefore in one embodiment of the present invention, the eHF (when formulated as instructed) comprises at least one fucosylated oligosaccharide and at least one N-acetylated oligosaccharide (e.g. 2'-fucosyllactose and lacto-N-neotetraose) wherein:
(i) the fucosylated oligosaccharide(s) is/are in a total amount of 0.8-1.5 g/L of the eHF; and/or
(ii) the N-acetylated oligosaccharide(s) is/are in a total amount of 0.5-0.8 g/L of the eHF.

In another embodiment the eHF of the present invention (when formulated as instructed) comprises at least one fucosylated oligosaccharide and at least one N-acetylated oligosaccharide (e.g. 2'-fucosyllactose and lacto-N-neotetraose) wherein:
(i) the fucosylated oligosaccharide(s) is/are in a total amount of 0.9-1.25 g/L of the eHF; and/or
(ii) the N-acetylated oligosaccharide(s) is/are in a total amount of 0.5-0.7 g/L of the eHF.

In another embodiment the eHF of the present invention (when formulated as instructed) comprises at least one fucosylated oligosaccharide and at least one N-acetylated oligosaccharide (e.g. 2'-fucosyllactose and lacto-N-neotetraose) wherein:
(i) the fucosylated oligosaccharide(s) is/are in a total amount of 1-1.2 g/L of the eHF; and/or
(ii) the N-acetylated oligosaccharide(s) is/are in a total amount of 0.5-0.6 g/L of the eHF.

In a preferred embodiment the eHF of the present invention (when formulated as instructed) comprises about 1 g/L of the fucosylated oligosaccharide(s) and about 0.5 g/L of the N-acetylated oligosaccharide(s). In a more preferred embodiment, the eHF of the present invention (when formulated as instructed) comprises about 1 g/L 2'-fucosyllactose and about 0.5 g/L lacto-N-neotetraose.

The eHF of the present invention may comprise 0.075-0.5 g/100 kcal, 0.1-0.3 g/100 kcal, or 0.12-0.25 g/100 kcal 2'-fucosyllactose and about 0.03-0.15 g/100 kcal, 0.05-0.12 g/100 kcal, or 0.05-0.1 g/100 kcal lacto-N-neotetraose. Preferably, the eHF of the present invention comprises about 0.15 g/100 kcal 2'-fucosyllactose and about 0.075 g/100 kcal lacto-N-neotetraose.

The fucosylated oligosaccharide(s) and the N-acetylated oligosaccharide(s) comprised in the eHF according to the invention are typically present in a ratio fucosylated oligosaccharide(s):N-acetylated oligosaccharide(s) of from 2.0:0.54 to 2.0:2.26, such as 2.0:0.76 to 2.0:1.8 or 2.0:0.8 to 2.0:1.4. In a particularly advantageous embodiment, this ratio is 2.0:1 or around 2.0:1.

In preferred embodiments, the eHF of the present invention: comprises about 1 g/L 2'-fucosyllactose and about 0.5 g/L lacto-N-neotetraose and/or about 0.15 g/100 kcal 2'-fucosyllactose and about 0.075 g/100 kcal lacto-N-neotetraose; about 0% by weight of the fat is MCTs and/or the eHF comprises no added MCTs; and optionally free amino acids present in a concentration of 20-25%, 21-23%, or about 22% by weight based on the total weight of amino acids.

In preferred embodiments, the eHF of the present invention: has no detectable peptides about 3000 Da or greater in size; at least about 95% of the peptides by weight have a molecular mass of less than about 1200 Da; optionally at least about 45%, at least about 50%, or 45-55% of the peptides by weight have a molecular mass of between 240 and 600 Da and/or free amino acids are present in a concentration of 20-25%, 21-23%, or about 22% by weight based on the total weight of amino acid; about 0% by weight of the fat is MCTs; and the eHF of the present invention comprises about 1 g/L 2'-fucosyllactose and about 0.5 g/L lacto-N-neotetraose and/or about 0.15 g/100 kcal 2'-fucosyllactose and about 0.075 g/100 kcal lacto-N-neotetraose.

Free Amino Acids

The eHF of the invention may comprise free amino acids.

Free amino acids may be incorporated in the eHF of the invention to supplement the amino acids comprised in the peptides. The levels of free amino acids may be chosen to provide an amino acid profile that is sufficient for infant nutrition, in particular an amino acid profile that satisfies nutritional regulations (e.g. European Commission Directive 2006/141/EC).

Example free amino acids for use in the eHF of the invention include histidine, isoleucine, leucine, lysine, methionine, cysteine, phenylalanine, tyrosine, threonine, tryptophan, valine, alanine, arginine, asparagine, aspartic acid, glutamic acid, glutamine, glycine, proline, serine, carnitine, taurine and mixtures thereof.

Free amino acids provide a protein equivalent source (i.e. contribute to the nitrogen content). As described above, having a high proportion of di- and tri-peptides may improve nitrogen (protein) absorption, even in patients with gut impairment. Accordingly, having a low proportion of free amino acids may also improve nitrogen (protein) absorption, even in patients with gut impairment.

Suitably, therefore, the free amino acids may be present in a concentration of 50% or less, 40% or less, 30% or less, or 25% or less by weight based on the total weight of amino acids. Preferably, the eHF comprises 25% or less by weight of free amino acids based on the total weight of amino acids. More preferably, the free amino acids are present in a concentration of 20-25%, 21-23%, or about 22% by weight based on the total weight of amino acids.

The free amino acids content may be determined by any method known of skill in the art. Suitably, the free amino acids content may be obtained by separation of the free amino acids present in an aqueous sample extract by ion exchange chromatography and photometric detection after post-column derivatization with ninhydrin reagent. Total amino acids content may be obtained by hydrolysis of the test portion in 6 mol/L HCl under nitrogen and separation of individual amino acids by ion-exchange chromatography, as describe above.

Carbohydrate

The carbohydrate content of the eHF of the invention is preferably in the range 9-14 g carbohydrate per 100 kcal.

The carbohydrate may be any carbohydrate which is suitable for use in an eHF.

Example carbohydrates for use in the eHF of the invention include lactose, saccharose, maltodextrin and starch. Mixtures of carbohydrates may be used.

In one embodiment, the carbohydrate content comprises maltodextrin. In one embodiment, at least about 20%, at least about 25%, at least about 30%, at least about 35%, at least about 40%, at least about 50%, at least about 60% or at least about 70% by weight of the total carbohydrate content is maltodextrin.

In one embodiment, the carbohydrate content comprises lactose. In one embodiment, at least about 20%, at least about 25%, at least about 30%, at least about 35%, at least about 40%, at least about 50%, at least about 60% or at least about 70% by weight of the total carbohydrate content is lactose.

In one embodiment, the carbohydrate comprises lactose and maltodextrin.

Fat

The fat content of the eHF of the invention is preferably in the range 4.0-6.0 g fat per 100 kcal.

The fat may be any lipid or fat which is suitable for use in an eHF.

Example fats for use in the eHF of the invention include sunflower oil, low erucic acid rapeseed oil, safflower oil, canola oil, olive oil, coconut oil, palm kernel oil, soybean oil, fish oil, palm oleic, high oleic sunflower oil and high oleic safflower oil, and microbial fermentation oil containing long chain, polyunsaturated fatty acids.

The fat may also be in the form of fractions derived from these oils, such as palm olein, medium chain triglycerides (MCT) and esters of fatty acids such as arachidonic acid, linoleic acid, palmitic acid, stearic acid, docosahexaeonic acid, linolenic acid, oleic acid, lauric acid, capric acid, caprylic acid, caproic acid, and the like.

Further example fats include structured lipids (i.e. lipids that are modified chemically or enzymatically in order to change their structure). Preferably, the structured lipids are sn2 structured lipids, for example comprising triglycerides having an elevated level of palmitic acid at the sn2 position of the triglyceride. Structured lipids may be added or may be omitted.

Oils containing high quantities of preformed arachidonic acid (ARA) and/or docosahexaenoic acid (DHA), such as fish oils or microbial oils, may be added.

Long chain polyunsaturated fatty acids, such as dihomo-γ-linolenic acid, arachidonic acid (ARA), eicosapentaenoic acid and docosahexaenoic acid (DHA), may also be added.

The eHF may comprise 2-20 mg ARA per 100 kcal, 5-15 ARA per 100 kcal, or about 10 mg ARA per 100 kcal and/or 2-20 mg DHA per 100 kcal, 5-15 DHA per 100 kcal, or about 10 mg DHA per 100 kcal. Preferably, the eHF comprises about 10 mg ARA per 100 kcal and about 10 mg DHA per 100 kcal.

Medium Chain Triglycerides (MCTs)

A high concentration of MCT may impair early weight gain. MCT is not stored and does not support fat storage. For instance, Borschel et al. have reported that infants fed formula without MCT gained significantly more weight between 1-56 days than infants fed formulas containing 50% of the fat from MCT (Borschel, M., et al., 2018. Nutrients, 10(3), p. 289).

Thus, about 30% or less by weight of the fat is medium chain triglycerides (MCTs) in the eHF of the present invention.

In some embodiments, about 25% or less by weight, 20% or less by weight, 15% or less by weight, 10% or less by weight, 5% or less by weight, 4% or less by weight, 3% or less by weight, 2% or less by weight, 1% or less by weight, 0.5% or less by weight, or 0.1% or less by weight of the fat is medium chain triglycerides (MCTs).

In some embodiments, 0-30% by weight, 0-25% by weight, 0-20% by weight, 0-15% by weight, 0-10% by weight, 0-5% by weight, 0-4% by weight, 0-3% by weight, 0-2% by weight, 0-1% by weight, 0-0.5% by weight, or 0-0.1% by weight of the fat is medium chain triglycerides (MCTs).

Preferably, the eHF comprises no added MCTs. Suitably, about 0% by weight of the fat is MCTs and/or the eHF comprises no detectable MCTs. Suitably, the eHF comprises no MCTs.

In preferred embodiments, the eHF of the present invention has no detectable peptides about 3000 Da or greater in size; at least about 95% of the peptides by weight have a molecular mass of less than about 1200 Da; 45-55% of the peptides by weight have a molecular mass of between 240 and 600 Da; free amino acids are present in a concentration of 20-25% by weight based on the total weight of amino acid; and the eHF comprises no added MCT.

Further Ingredients

The eHF of the invention preferably also contains all vitamins and minerals understood to be essential in the daily diet in nutritionally significant amounts. Minimum requirements have been established for certain vitamins and minerals.

Example vitamins, minerals and other nutrients for use in the eHF of the invention include vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chlorine, potassium, sodium, selenium, chromium, molybdenum, taurine and L-carnitine. Minerals are usually added in their salt form.

The eHF of the invention may comprise one or more carotenoids.

The eHF of the invention may also comprise at least one probiotic. The term "probiotic" refers to microbial cell preparations or components of microbial cells with beneficial effects on the health or well-being of the host. In particular, probiotics may improve gut barrier function.

Preferred probiotics are those which as a whole are safe, are L(+) lactic acid producing cultures and have acceptable shelf-life for products that are required to remain stable and effective for up to 24 months.

Examples of probiotic micro-organisms for use in the eHF of the invention include yeasts, such as *Saccharomyces, Debaromyces, Candida, Pichia* and *Torulopsis*; and bacteria, such as the genera *Bifidobacterium, Bacteroides, Clostridium, Fusobacterium, Melissococcus, Propionibacterium, Streptococcus, Enterococcus, Lactococcus, Staphylococcus, Peptostrepococcus, Bacillus, Pediococcus, Micrococcus, Leuconostoc, Weissella, Aerococcus, Oenococcus* and *Lactobacillus*.

Specific examples of suitable probiotic microorganisms are: *Saccharomyces cereviseae, Bacillus coagulans, Bacillus licheniformis, Bacillus subtilis, Bifidobacterium bifidum, Bifidobacterium infantis, Bifidobacterium longum, Enterococcus faecium, Enterococcus faecalis, Lactobacillus acidophilus, Lactobacillus alimentarius, Lactobacillus casei* subsp. *casei, Lactobacillus casei Shirota, Lactobacillus curvatus, Lactobacillus delbruckii* subsp. *lactis, Lactobacillus farciminus, Lactobacillus gasseri, Lactobacillus helveticus, Lactobacillus johnsonii, Lactobacillus rhamnosus (Lactobacillus GG), Lactobacillus sake, Lactococcus lactis, Micrococcus varians, Pediococcus acidilactici, Pediococcus pentosaceus, Pediococcus acidilactici, Pediococcus halophilus, Streptococcus faecalis, Streptococcus thermophilus, Staphylococcus carnosus* and *Staphylococcus xylosus*.

The eHF of the invention may also contain other substances which may have a beneficial effect such as prebiotics, lactoferrin, fibres, nucleotides, nucleosides and the like.

Methods of Treatment

In one aspect the invention provides a method of feeding an infant comprising administering to the infant an eHF according to the present invention.

The term "infant" refers to a child under the age of 12 months, for example a child between 0 and 6 months of age. The infants are human.

Cow's Milk Protein Allergy

Preferably, the infant has cow's milk protein allergy. The term "allergy" refers to a hypersensitivity of the immune system to a substance which is normally tolerated. The allergy may be an allergy detected by a medical doctor.

Cow's milk protein (CMP) is the leading cause of food allergy in infants, affecting 2-3% children worldwide. Most children with CMP-allergy (CMPA) have two or more symptoms: 50-70% have skin symptoms, 50-60% have gastrointestinal symptoms, and 20-30% have airway symptoms. Severe and life-threatening symptoms may occur in 10% of children. (Nutten, 2018. EMJ Allergy Immunol, 3(1), pp. 50-59).

Skin symptoms can include urticaria, atopic eczema, and angioedema. Gastrointestinal symptoms can include dysphagia, frequent regurgitation, colic, abdominal pain, vomiting, anorexia, refusal to feed, diarrhea (with or without intestinal protein or blood loss), constipation (with or without perianal rash), failure to thrive, occult blood loss, and iron-deficiency anemia. Respiratory symptoms can include runny nose, wheezing, and chronic coughing. Other general symptoms include anaphylaxis and shock-like symptoms with severe metabolic acidosis, vomiting and diarrhea (food protein-induced enterocolitis syndrome). These symptoms are typically unrelated to infections, drug intake, or other causes (Koletzko, S., et al., 2012. Journal of pediatric gastroenterology and nutrition, 55(2), pp. 221-229).

Specialty infant formulas are recommended when breast-feeding is not possible. ESPGHAN recommends that for non-breast-fed infants with CMPA, formulas based on extensively hydrolysed proteins are used, i.e. eHFs, with proven efficacy in infants with CMPA (Koletzko, S., et al., 2012. Journal of pediatric gastroenterology and nutrition, 55(2), pp. 221-229).

Accordingly, in one aspect the invention provides a method of treating and/or preventing cow's-milk protein allergy and/or one or more of urticaria, atopic eczema, angioedema, dysphagia, frequent regurgitation, colic, abdominal pain, vomiting, anorexia, refusal to feed, diarrhea (with or without intestinal protein or blood loss), constipation (with or without perianal rash), failure to thrive, occult blood loss, iron-deficiency anemia, runny nose, wheezing, chronic coughing, anaphylaxis, and shock-like symptoms with severe metabolic acidosis, vomiting and diarrhea (food protein-induced enterocolitis syndrome) in an infant, preferably wherein the infant does not have an infection, wherein the method comprises administering to the infant an eHF according to the present invention.

In another aspect the invention provides an eHF according to the present invention for use in treating and/or preventing cow's-milk protein allergy and/or one or more of urticaria, atopic eczema, angioedema, dysphagia, frequent regurgitation, colic, abdominal pain, vomiting, anorexia, refusal to feed, diarrhea (with or without intestinal protein or blood loss), constipation (with or without perianal rash), failure to thrive, occult blood loss, iron-deficiency anemia, runny nose, wheezing, chronic coughing, anaphylaxis, and shock-like symptoms with severe metabolic acidosis, vomiting and diarrhea (food protein-induced enterocolitis syndrome) in an infant, preferably wherein the infant does not have an infection.

Obesity

Infants with CMPA may require higher levels of protein due to e.g. gastrointestinal symptoms. Thus, eHFs typically contain 2.6-2.8 g protein per 100 kcal, to cover the needs of infants suffering gastrointestinal pathologies with severe malabsorption or infants requiring more proteins and calories to cover a higher metabolic rate.

Consumption of higher protein infant formula has, however been associated with greater weight and body mass index at 2 years of age and higher circulating concentrations of plasma essential amino acids, insulin-like growth factor-1, and C-peptide, which can induce weight gain and adipogenic activity. Lower protein content may diminish the later risk of obesity (Totzauer, M., et al., 2018. Obesity, 26(7), pp. 1203-1210).

For instance, the European Childhood Obesity Project (CHOP) has shown that infants fed infant formula containing high protein levels gained more weight during the first year of life and had a higher BMI and risk of obesity at the age of 6 years than those fed an infant formula containing lower levels of protein (Totzauer, M., et al., 2018. Obesity, 26(7), pp. 1203-1210).

Importantly, the eHFs must still be suitable for infants with CMPA. However, decreasing the amount of protein may not support appropriate growth and development of allergic infants.

The present inventors have surprisingly shown that the eHFs of the present invention supported appropriate growth and development of allergic infants. Moreover, the eHF was safe and well-tolerated.

Accordingly, in one aspect the invention provides a method of preventing obesity and/or reducing the risk of obesity in an infant, wherein the method comprises administering to the infant an eHF according to the present invention. Preferably, the infant has cow's milk protein allergy. The method may also treat and/or prevent cow's-milk protein allergy in the infant.

In another aspect the invention provides an eHF according to the present invention for use in preventing obesity and/or reducing the risk of obesity in an infant. Preferably, the infant has cow's milk protein allergy. In particular, the invention provides an eHF according to the present invention for use in preventing obesity and/or reducing the risk of obesity in an infant; and for use in for use in treating and/or preventing cow's-milk protein allergy (CMPA) and/or one or more symptom of CMPA.

Method of Manufacture

The eHF of the invention may be prepared in any suitable manner.

For example, the eHF may be prepared by blending together the hydrolysed protein source, the carbohydrate source and the fat source in appropriate proportions. If used, the further emulsifiers may be included at this point. The vitamins and minerals may be added at this point but vitamins are usually added later to avoid thermal degradation. Any lipophilic vitamins, emulsifiers and the like may be dissolved in the fat source prior to blending. Water, preferably water which has been subjected to reverse osmosis, may then be mixed in to form a liquid mixture. Commercially available liquefiers may be used to form the liquid mixture. The liquid mixture may then be homogenised.

The liquid mixture may then be thermally treated to reduce bacterial loads. This may be carried out, for example, by means of steam injection, or using an autoclave or heat exchanger, for example a plate heat exchanger.

The liquid mixture may then be cooled and/or homogenised. The pH and solid content of the homogenised mixture may be adjusted at this point.

The homogenised mixture may then be transferred to a suitable drying apparatus such as a spray dryer or freeze dryer and converted to powder. If a liquid eHF is preferred, the homogenised mixture may be sterilised, then aseptically filled into a suitable container or may be first filled into a container and then retorted.

EXAMPLES

The invention will now be further described by way of Examples, which are meant to serve to assist one of ordinary skill in the art in carrying out the invention and are not intended in any way to limit the scope of the invention.

Example 1—Illustrative Extensively Hydrolysed Infant Formula

Below is an illustrative extensively hydrolysed infant formula according to the present invention. The eHF of the invention preferably contains all nutrients, vitamins and minerals understood to be essential in the daily diet in nutritionally significant amounts. Minimum requirements have been established for certain nutrients, vitamins and minerals.

| Nutrient | Unit | per 100 g | per 100 kcal | per 100 ml |
|---|---|---|---|---|
| Energy | kcal | 506 | 100 | 67 |
| Fat | g | 26 | 5.1 | 3.4 |
| MCT | g | 0 | 0 | 0 |
| Available carbohydrates | g | 57 | 11 | 7.5 |
| Protein | g | 11.1 | 2.2 | 1.5 |
| 2'FL | g | 0.76 | 0.15 | 0.1 |
| LNnT | g | 0.38 | 0.075 | 0.05 |

Example 2—Safety and Efficacy of Extensively Hydrolysed Infant Formula with Reduced Protein Content Study Design The Safety and efficacy of extensively hydrolysed infant formula with reduced protein content was investigated in a controlled, double blind, randomized, multi-center, interventional clinical trial of 2 parallel formula fed groups.

The primary objective of the clinical study was to show that infants with cow milk protein allergy (CMPA) and fed with a new eHF with reduced level of protein (Althéra 2.2) and with two Human Milk Oligosaccharides (HMOs) (Test Formula) have a growth in line with infants fed with commercial eHF (Althéra 2.5) without HMOs (Control Formula). The commercial eHF is currently approved as a food for special medical purposes (Regulation (EU) 2016/128). The primary study endpoint was therefore weight gain per day from enrolment to 4 months of follow-up with an age window at enrolment of 0 to 6 months (non-inferiority design).

The secondary objectives included assessing whether consumption of Test formula by CMPA infants is well tolerated and allows for age appropriate growth. Secondary study endpoints therefore included changes in other growth parameters, including weight-for-age, length-for-age, head circumference-for-age Z scores (WHO growth reference).

The trial population was full-term infants with physician diagnosed CMPA as per standard clinical practice and with at least 2 symptoms per inclusion criterion. 130 infants completing 4 months of study formula intake were required.

The inclusion criteria were:
1. Full term infant (37 weeks≤gestation≤42 weeks);
2. 2500 g≤birth weight≤4500 g;
3. Having obtained the infant's parent's (or both parents' if required per country regulation) or legally authorized representative's (LAR) written informed consent;
4. Infant aged between birth and 6 months;
5. Exclusively formula-fed at time of enrolment or mothers of CMPA infant doing breastfeeding and independently elected before enrolment to exclusively formula feed; and
6. Infants with physician diagnosed (and untreated with extensively hydrolysed or amino acid infant formula) CMPA as per standard clinical practice and with at least 2 symptoms present from the following—Crying, Regurgitations, Liquid stools or Constipation, Skin atopic lesion, Urticaria or Respiratory symptoms. For diagnosis based on either a positive Ig E blood test, skin prick test, patch test or food challenge, only 1 symptom from above needs to be present.

The exclusion criteria were:
1. Congenital illness or malformation that may affect growth.
2. Demonstrated chronic malabsorption not due to CMPA.
3. Significant pre-natal and/or serious post-natal disease other than CMPA before enrolment (per investigator's medical decision).
4. Minor parent(s).
5. Infants whose parents or caregivers cannot be expected to comply with study procedures.
6. Currently participating or having participated in another clinical trial since birth.

The Test formula and the Control formula are shown below:

| Nutrient | Unit | Test formula per 100 g | Test formula per 100 kcal | Test formula per 100 ml | Control formula per 100 g | Control formula per 100 kcal | Control formula per 100 ml |
|---|---|---|---|---|---|---|---|
| Energy | kcal | 506 | 100 | 67 | 506 | 100 | 67 |
| Fat | g | 26 | 5.1 | 3.4 | 26 | 5.1 | 3.4 |
| MCT (Medium Chain Triglycerides) | g | 0 | 0 | 0 | 0 | 0 | 0 |
| Available Carbohydrates | g | 57 | 11 | 7.5 | 55.5 | 11 | 7.3 |
| Micronutrient/vitamin/mineral mix | mg | 2350 | 465 | 310 | 2350 | 465 | 310 |
| 2'FL | g | 0.75 | 0.15 | 0.10 | — | — | — |
| LNnT | g | 0.38 | 0.075 | 0.05 | — | — | — |

In the Test formula and the Control formula:
>99% by weight of the peptides had a molecular mass less than 3000 Da.
>95% by weight of the peptides had a molecular mass less than 1200 Da.
~52% by weight of the peptides were di- and tri-peptides (peptides with a molecular mass of 600-240 Da).
~22.4% by weight of the total amino acids were free amino acids in the Test formula and Control formula.
There was no detectable β-lactoglobulin (i.e. β-lactoglobulin content was less than 0.01 mg/kg).
There was no detectable casein (i.e. casein content was less than 0.2 mg/kg).

Both formulas were in powder form, to be prepared as per instructions printed on the product label on the tins for oral intake by infants in amounts suitable for their weight, age and appetite.

Infants were given study formula until 4 month post-baseline at minimum (principal study period) and for as long as the infant requires per medical prescription (to maximum of 12 months of age).

Volume of feed required by the infant per day depended upon age, weight and appetite. Product was given ad libitum to the infant, although parents or caregivers followed guidelines printed on the label regarding appropriate volumes of feed to be offered per day and/or took advice from study staff.

Infants were attended up to 7 study visits: Baseline (enrolment), then every month until 4 months after baseline (+1, +2, +3, +4 months) and then 6 months after baseline. One additional final visit is planned when the infant will reach the age of 12 months old.

Randomization was a ratio of 1:1 per study formula group; and performed by minimization in Medidata balance. Stratification was by age at enrolment (0 to 60 days, 61 to 120 days, and above 120 days), gender, mode of delivery (vaginal or caesarean section). In case twins are enrolled, they were randomized to the same formula.

Study Results

The study showed that the Test formula supported appropriate growth and development of allergic infants, and was safe and well tolerated.

Primary analysis assessed whether infants fed with Test formula had a growth non-inferior to infants fed with Control formula over the 4 first months of treatment. Treatment difference and the one-sided simultaneous 97.5% confidence interval was performed by a mixed model. Weight (kg) was modeled as a function of age (months), treatment, gender, age*treatment, age*gender. The model assumed a variance covariance matrix with autocorrelation type I structure for outcome at adjacent visit. The difference computed was used to estimate the treatment effect at 63 days [(14+112)/2]. A divisor of 0.0305 was used to rescale the estimate from kg/months to g/day. Key secondary analysis was done including for body weight, body length, and head circumference.

Figure 1:
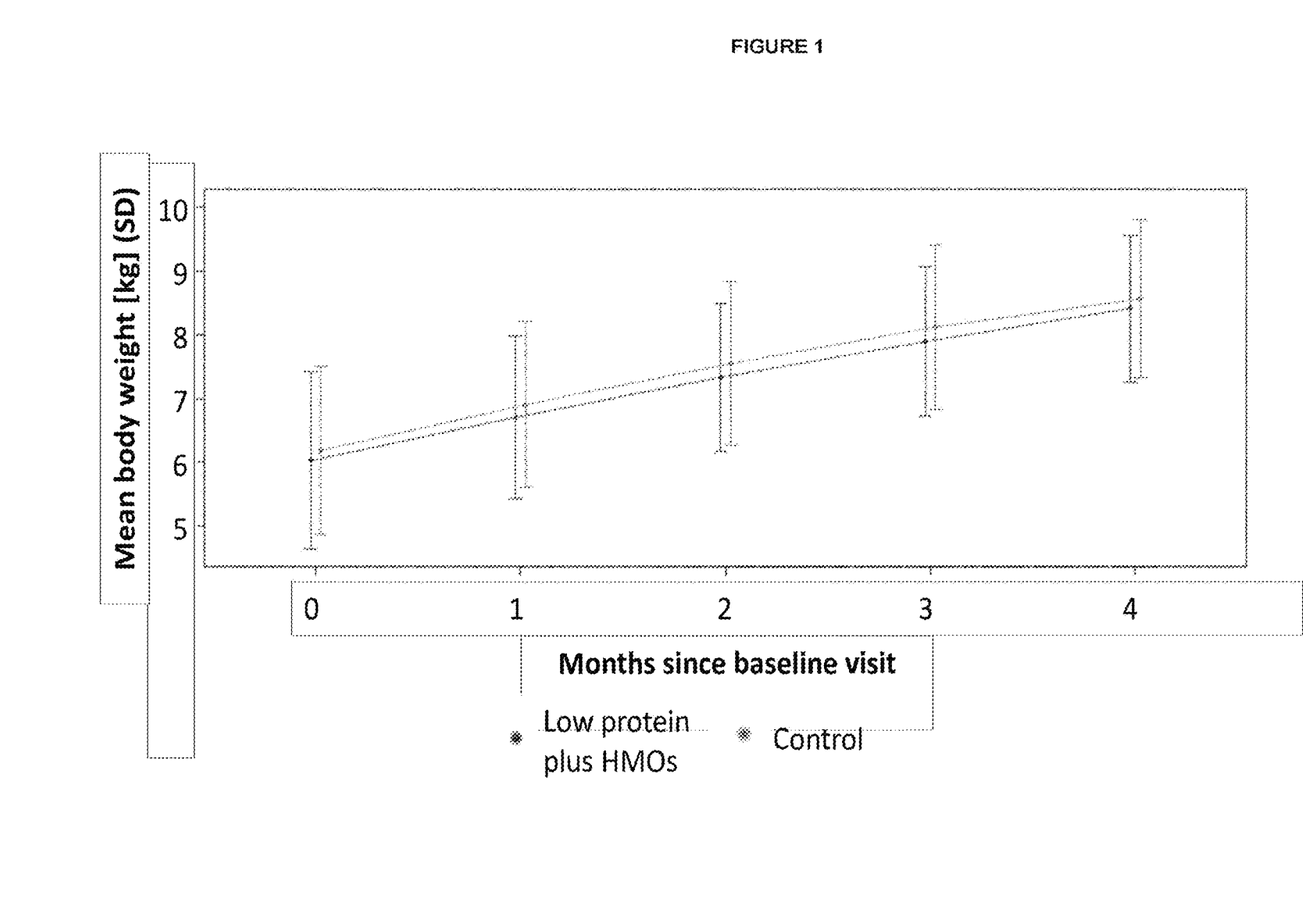
FIG. 1—Body weight
Figure 2:
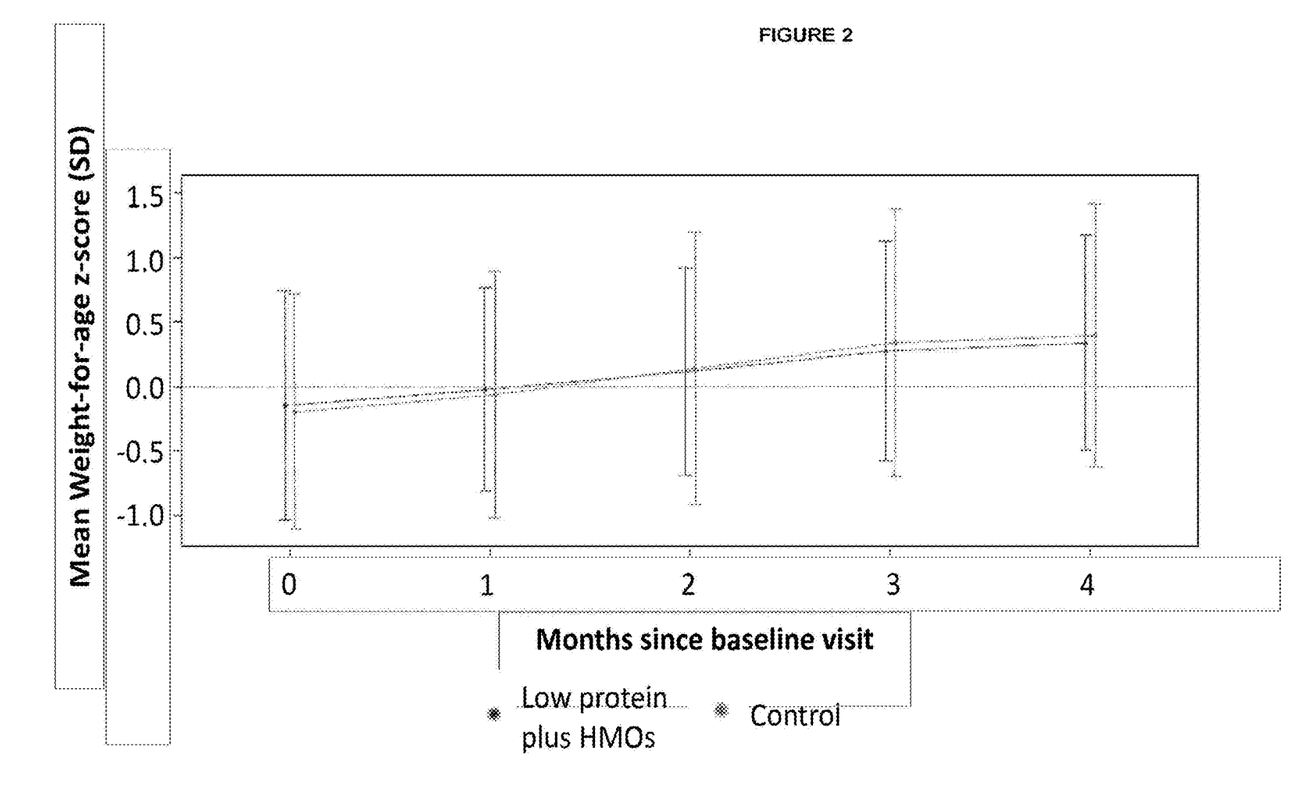
FIG. 2—Weight-for-age Z scores
Figure 3:
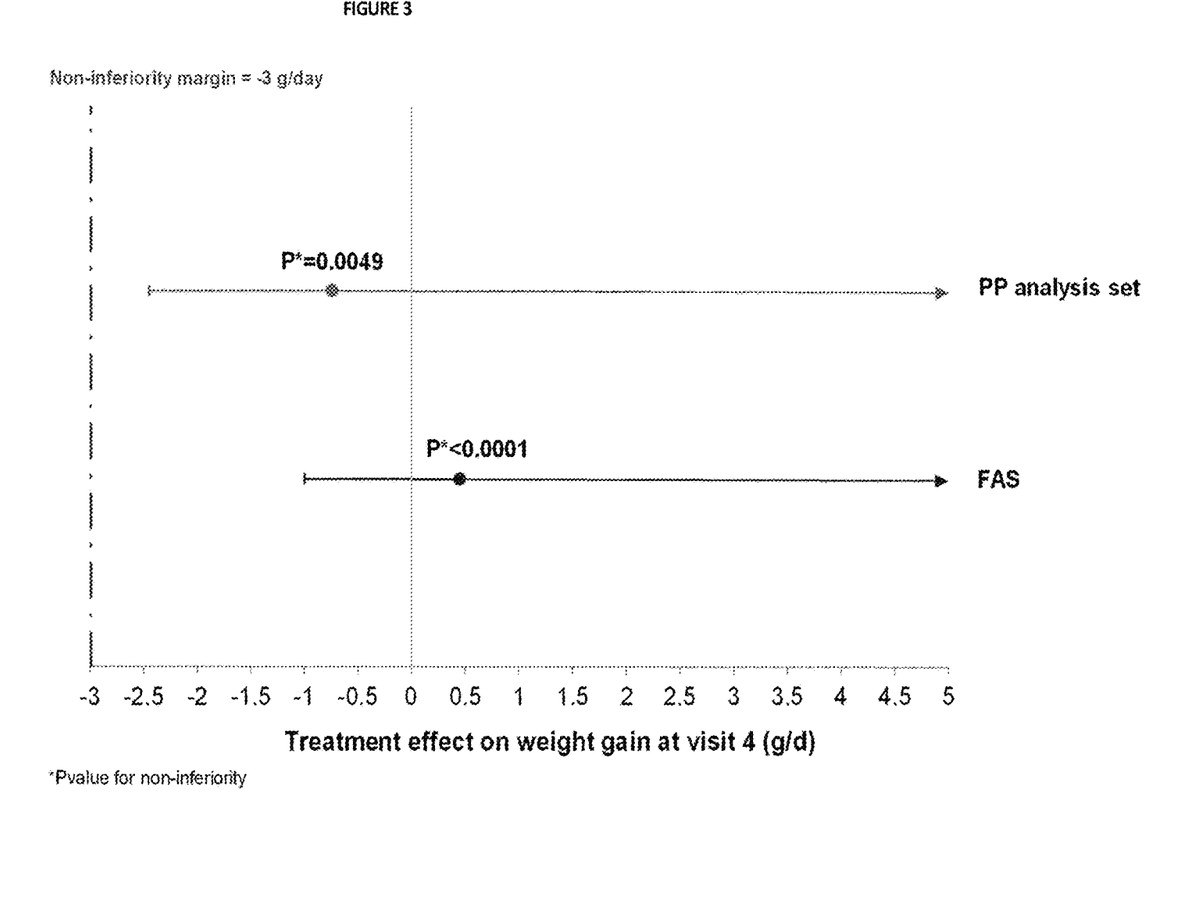
FIG. 3—Non-inferiority: Weight gain per day
Figure 4:
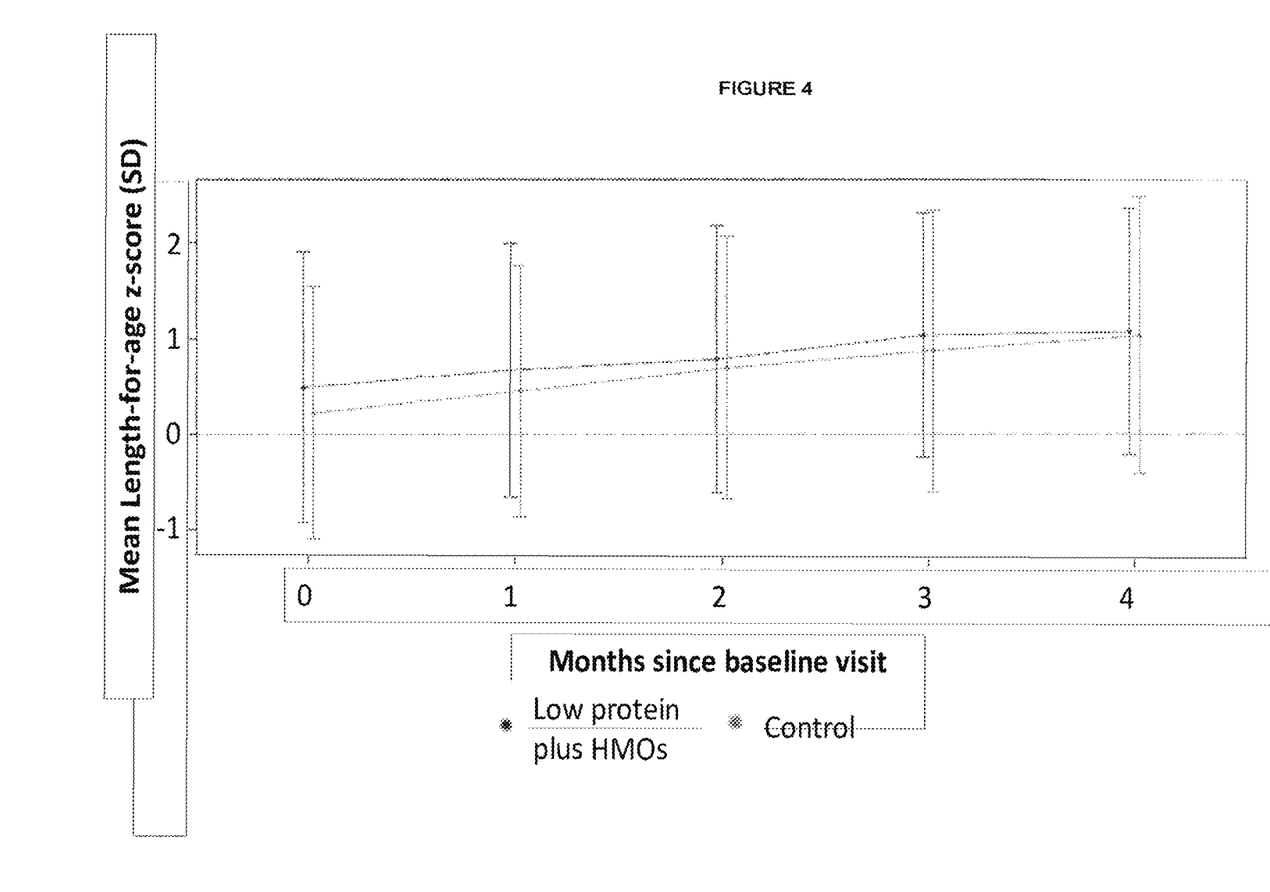
FIG. 4—Length-for-age Z score
Figure 5:
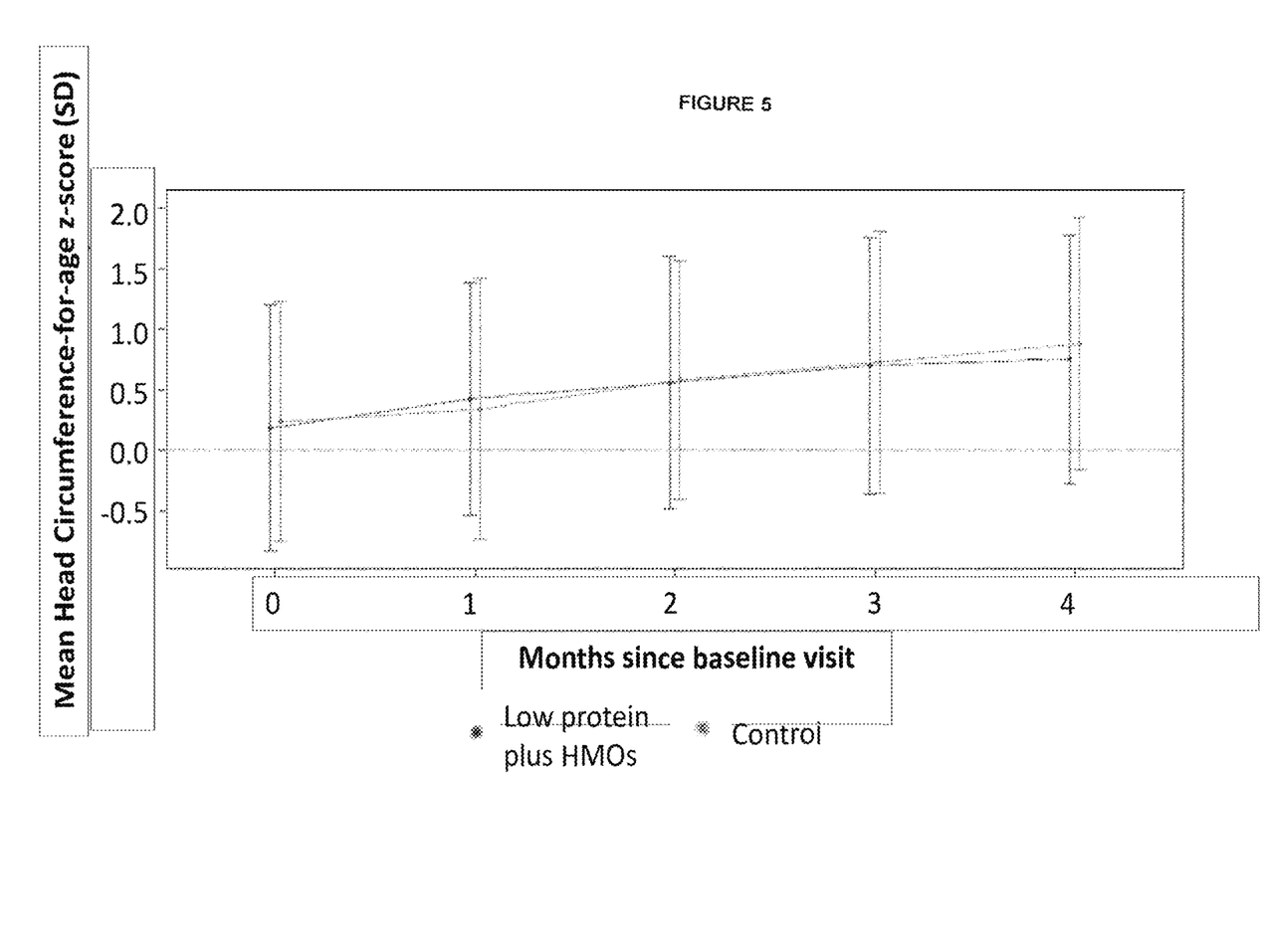
FIG. 5—Head circumference-for-age Z score
Figure 6:
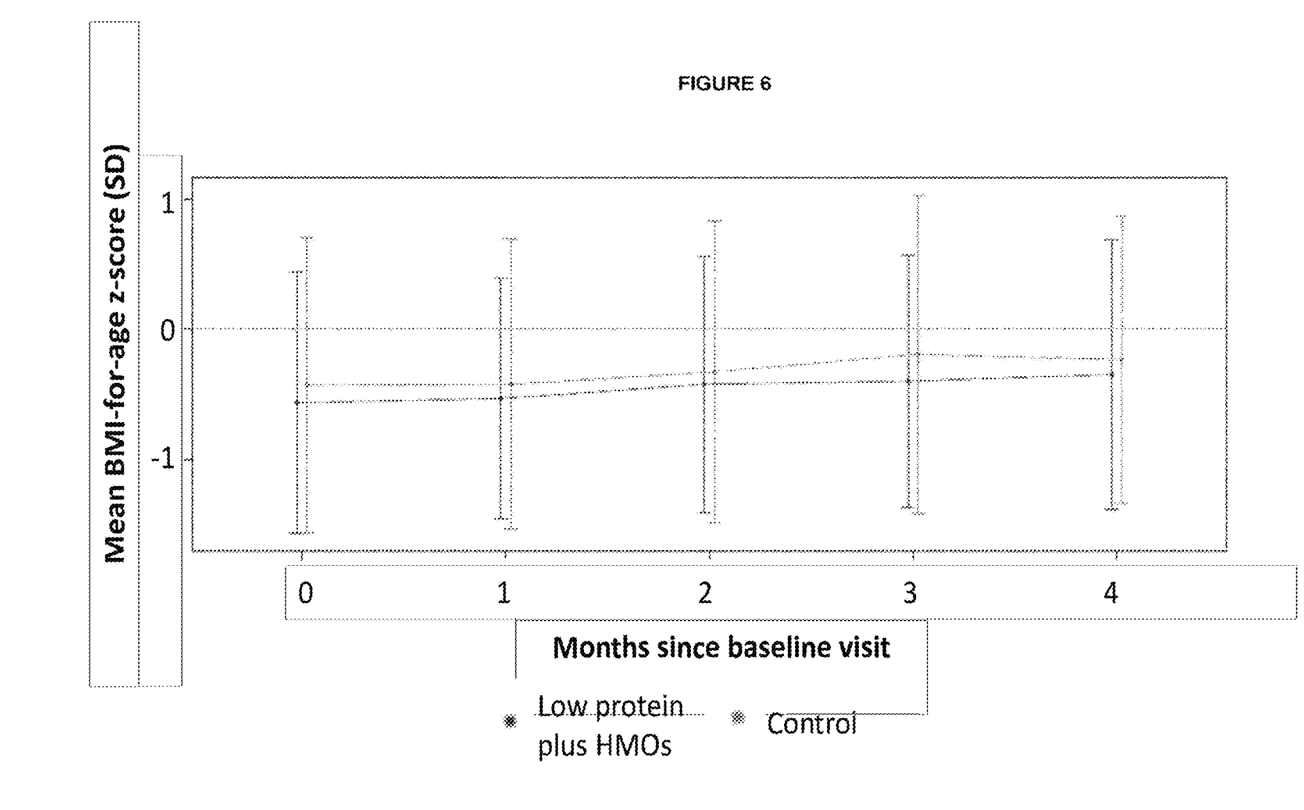
FIG. 6—BMI-for-age Z score

Infants receiving the Test formula with HMO and reduced protein content achieved normal growth, in line with to the WHO growth reference (FIGS. 1-6). In particular, primary analysis showed that weight gain [g/d] of infants receiving Test formula was non-inferior to growth with the Control formula (FIGS. 1-3). There were no significant differences in any of the anthropometric parameters at any of the time points up to the 4-month follow up (FIGS. 4-6).

The safety profile of Test and Control formula were similar. There were no significant group differences in the rates of adverse events of interest.

All publications mentioned in the above specification are herein incorporated by reference. Various modifications and variations of the disclosed methods, cells, compositions and uses of the invention will be apparent to the skilled person without departing from the scope and spirit of the invention. Although the invention has been disclosed in connection with specific preferred embodiments, it should be understood that the invention as claimed should not be unduly limited to such specific embodiments. Indeed, various modifications of the disclosed modes for carrying out the invention, which are obvious to the skilled person are intended to be within the scope of the following claims.

The invention claimed is:

1. An extensively hydrolysed infant formula (eHF) comprising protein, carbohydrate and fat, wherein extensively hydrolysed is defined as at least 95% of peptides by weight have a molecular mass of less than about 3000 Da, wherein the eHF comprises about 2.4 g or less protein per 100 kcal, and wherein about 30% or less by weight of the fat is medium chain triglycerides (MCTs) and wherein the eHF comprises 2'-fucosyllactose (2'FL) and/or lacto-N-neotetraose (LNnT).

2. The eHF according to claim 1, wherein the eHF comprises 0.5-3 g/L of 2'FL.

3. The eHF according to claim 1, wherein the eHF comprises 0.2-1 g/L of LNnT.

4. The eHF according to claim 1, wherein the eHF comprises about 1.8 g or more of the protein per 100 kcal.

5. The eHF according to claim 1, wherein the eHF comprises 1.8-2.4 g of the protein per 100 kcal.

6. The eHF according to claim 1, wherein the eHF comprises about 2.2 g of the protein per 100 kcal.

7. The eHF according to claim 1, wherein about 25% or less by weight of the fat is the medium chain triglycerides (MCTs).

8. The eHF according to claim 1, wherein the eHF comprises no medium chain triglycerides (MCTs).

9. The eHF according to claim 1, wherein at least about 95% by weight of peptides in the eHF have a molecular mass of less than about 3000 Da.

10. The eHF according to claim 1, wherein at least about 85% by weight of peptides in the eHF have a molecular weight of less than about 1200 Da.

11. The eHF according to claim 1, wherein at least about 45% by weight of peptides in the eHF are di- and tripeptides.

12. The eHF according to claim 1, wherein at least about 45% by weight of peptides in the eHIF have a molecular weight of between 240 and 600 Da.

13. The eHF according to claim 1, wherein at least about 50% of the protein is whey protein.

14. The eHF eHF according to claim 1, wherein the eHF comprises free amino acids.

15. The eHF according to claim 14, wherein the free amino acids are present in a concentration of 20-25% by weight based on total weight of amino acids.

16. The eHF according to claim 1, wherein the eHF comprises 9-14 g carbohydrate per 100 kcal.

17. The eHF according to claim 1, wherein the eHF has an energy density of 60-72 kcal per 100 mL.

18. The eHF according to claim 1, wherein there are no detectable peptides in the eHF about 3000 Da or greater in size.

* * * * *